US008131576B2

(12) United States Patent
Rothberg et al.

(10) Patent No.: US 8,131,576 B2
(45) Date of Patent: Mar. 6, 2012

(54) METHOD AND SYSTEM FOR IDENTIFYING CONFLICTING CONSTRAINTS IN MIXED INTEGER PROGRAMS

(75) Inventors: Edward E. Rothberg, Palo Alto, CA (US); Roland Wunderling, Graz (AT)

(73) Assignee: International Business Machines Corporation, Armonk, NY (US)

( * ) Notice: Subject to any disclaimer, the term of this patent is extended or adjusted under 35 U.S.C. 154(b) by 1313 days.

(21) Appl. No.: 11/809,841

(22) Filed: Jun. 1, 2007

(65) Prior Publication Data

US 2009/0228291 A1  Sep. 10, 2009

Related U.S. Application Data

(60) Provisional application No. 60/810,419, filed on Jun. 2, 2006.

(51) Int. Cl.
*G06F 17/30* (2006.01)
(52) U.S. Cl. ........................................................ 705/7.11
(58) Field of Classification Search .................. 705/7.11
See application file for complete search history.

(56) References Cited

U.S. PATENT DOCUMENTS

| 6,606,529 | B1 * | 8/2003 | Crowder et al. | ............ | 700/100 |
| 2002/0156663 | A1 | 10/2002 | Weber et al. | | |
| 2004/0143352 | A1 * | 7/2004 | Gyorfi et al. | .................... | 700/99 |
| 2004/0172321 | A1 | 9/2004 | Vemula et al. | | |
| 2004/0181420 | A1 * | 9/2004 | Bjelogrlic et al. | ................ | 705/1 |
| 2004/0196946 | A1 | 10/2004 | Chao et al. | | |
| 2005/0027577 | A1 * | 2/2005 | Saeed | .............................. | 705/8 |

OTHER PUBLICATIONS

Danna et al "Danna" (Exploring relaxation induced neighborhoods to improve MIP solutions).*
Beasley et al (Scheduling Aircraft Landings—the static case).*
Chinneck et al (Locating Minimal Infeasible Constraint Sets in Linear Programs).*
Anbil et al., "Recent Advances in Crew-Pairing Optimization at American Airlines", Interfaces 21:1, pp. 62-74, Jan.-Feb. 1991.
Bartak, "Theory and Practice of Constraint Propagation", in J. Figwer (editor) Proceedings of the 3rd Workshop on Constraint Programming in Decision and Control, Jun. 2001, Poland.
Gleeson et al., "Identifying Minimally Infeasible Subsystems of Inequalities", ORSA Journal on Computing, vol. 2, No. 1, Winter 1990, pp. 61-63.
Gondzio, "Presolve Analysis of Linear Programs Prior to Applying an Interior Point Method", Logilab, HEC Geneva, Section of Management Studies, University of Geneva, Switzerland, Technical Report 1994.3, Feb. 7, 1994, revised Dec. 20. 1994, pp. 1-29.
Guieu et al., "Analyzing Infeasible Mixed-Integer and Integer Linear Programs", INFORMS Journal on Computing, vol. 11, No. 1, Winter 1999, pp. 63-77.

(Continued)

*Primary Examiner* — Romain Jeanty
(74) *Attorney, Agent, or Firm* — Steven M. Greenberg, Esq.; Carey, Rodriguez, Greenberg & O'Keefe

(57) ABSTRACT

The present invention relates to methods and systems for generating solutions to global optimization problems. In one aspect, the invention allows for determining whether models of optimization problems are infeasible. In another aspect, the invention allows for identifying relatively small sets of constraints that make a model infeasible.

In yet another aspect, the invention provides methods and systems for creating one or more artificial infeasibilities in a model so as to seek improvement upon a known value of the objective function. Creation of artificial constraints in this manner may also permit identification of a relatively small set of constraints that may be limiting the value of the objective function.

14 Claims, 3 Drawing Sheets

OTHER PUBLICATIONS

Junker, "QuickXplain: Conflict Detection for Arbitrary Constraint Propagation Algorithms", IJCAI'01 Workshop on Modelling and Solving Problems with Constraints, 2001.

Walters, "Learning while Searching", Research Proposal—Semester 1, 2005, School of Computer Science and Software Engineering, Monash University.

* cited by examiner

METHOD AND SYSTEM FOR IDENTIFYING CONFLICTING CONSTRAINTS IN MIXED INTEGER PROGRAMS

CROSS-REFERENCES TO RELATED APPLICATIONS

None

STATEMENT REGARDING FEDERALLY SPONSORED RESEARCH OR DEVELOPMENT

None

INCORPORATION-BY-REFERENCE OF MATERIAL SUBMITTED ON A COMPACT DISC

None

BACKGROUND OF THE INVENTION

1. Field of the Invention

The present invention relates generally to systems and methods for generating solutions to global optimization problems. More particularly, the present invention relates to systems and methods for finding improved solutions to mixed integer problems through improving the identification of sets of conflicting constraints in a mixed integer program.

2. Brief Summary of the Invention

Mixed Integer Programming is a versatile, widely used technique for solving a variety of practical optimization problems. Generally, a mixed integer program ("MIP") is an optimization problem of the form:

minimize f(x)
subject to G(x)=b
$l \leq x \leq u$
some or all $x_j$ integral, where x is a vector of variables, l and u are vectors of bounds, f(x) is an objective expression, and G(x)=b is a set of constraint expressions. While the above model has a minimization objective, one of skill will recognize that models may have maximization objectives.

The simplest and most widely used form of MIP model is the Mixed Integer Linear Program (MILP):

minimize $c^T x$
subject to Ax=b
$l \leq x \leq u$
some or all $x_j$ integral, where A is an m by n matrix, called the constraint matrix, and c is the linear objective vector. Thus, as one of ordinary skill in the art would recognize, a MILP is a linear program ("LP") with an integrality restriction on some or all of the variables. Other forms of MIP model include the Mixed Integer Quadratic Program (MIQP), Mixed Integer Quadratically Constrained Program (MIQCP), and Mixed Integer Non Linear Program (MINLP).

While the integrality restriction makes MIPs difficult to solve (both in general terms, and NP-hard in the technical sense), this restriction also makes the mixed-integer modeling paradigm a powerful tool in representing real-world business applications. In many situations, the solution to a MIP can yield a cost or benefit (for example, in dollars or other units) of pursuing a certain course of business. In a situation wherein the MIP solution yields a cost in dollars, the optimal solution might be one wherein the dollar cost is minimized. In a situation wherein the MIP solution yields the number of linear-feet of lumber that can be harvested from a forest, the optimal solution might be a solution wherein the number of linear-feet is maximized.

While absolute optimal solutions can and have been found for some MIPS (e.g., some MIPs with a small number of variables (n) or constraints (m)), for many MIPS, only solutions that are not provably optimal have been found. These solutions are often referred to as "best known" or "best objective" solutions. Such best known solutions still provide significant practical value in many situations. In these cases, it is often desirable to find the best known solution using the least amount of resources. For still other MIPs, no solution has yet been found.

(As used herein, "resources" can refer to money, time (seconds, minutes, hours, days, weeks, etc.), computer processor cycles, man-hours, or any other resource of which further depletion might theoretically yield a better solution. As also used herein, "optimize" means to improve the result, regardless of whether such improvement results in the absolute optimal result.)

With unlimited resources it might be possible to find one or more provably optimal or best objective solutions to any MIP. However, within the bounds of practicality, available resources are often limited. For example, the MIP solution might yield the distance and roads taken for the shortest road route between Lakeside, Ariz. and New York, N.Y. If this solution is being generated by a business interest, for a person using an internet mapping service, the limiting resource might be a time limitation of ten seconds. If forced to wait longer than ten seconds for a solution, the person might become frustrated and request a solution from a competitor. In this example, it would be desirable to find a best known solution with a resource limitation of ten seconds. However, without the resource limitation, it might be possible to find a provably optimal solution by considering every road leaving Lakeside, Ariz., every connecting road, and so on. Yet, the provably optimal solution might be less valuable if not delivered within the appropriate resource limitation.

In another example, the MIP solution might yield the cost in dollars of deploying each of 10,000 employees, having diverse skill sets, to perform certain tasks for a company. It might be desirable to determine the least costly manner to deploy the employees. Without any resource limitation, it might be possible to find a provably optimal solution by considering every possible deployment of every employee. Yet, the provably optimal solution might be less valuable if not delivered within an appropriate resource limitation. That is, the cost of exceeding the resource limitation might exceed the cost savings realized by finding a provably optimal solution.

Other examples of optimality problems addressed by MIPs include optimization of supply chain configurations (see U.S. Patent Application Publication Serial No. US 2002/0156663 A1, dated Oct. 24, 2002), loading patterns for a nuclear reactor core (see U.S. Patent Application Publication Serial No. US 2004/0196946 A1, dated Oct. 7, 2004), supply channel and contract modeling (see U.S. Patent Application Publication Serial No. US 2004/0172321 A1, dated Sep. 2, 2004), airline crew pairing (see "Recent Advances in Crew-Pairing Optimization at American Airlines," by Ranga Anbil et al.), airline scheduling and ticket sales, and many other complex problems.

Before MIP solving techniques can be applied to a problem, a mathematical model of the MIP must be formulated. The mathematical model may consist of continuous decision variables, integer decision variables, or constraints, or a combination of some or all of these. Additionally, unless the objective function is zero, at least one objective function must be formulated. For example, the objective function for a business might define an objective of maximizing profits, maximizing revenue, minimizing costs, maximizing the number of employees, minimizing the number of employees, or some combination of these or other goals. An airline might define an objective of minimizing the number of empty seats on a flight while maximizing ticket sale revenue.

Errors in the formulation of the MIP and the objective function may lead to infeasible models. A simple example of such an infeasible model is described in the following paragraph.

An electrical generation company might devise a model for generating power with two power plants, each plant having five generators. In that model, among other constraints, the company might require that each plant have a minimum of three generators active at all times, that each plant have one generator inactive for use as an emergency backup at all times, that each plant have one generator inactive for maintenance at all times, and that each generator must be maintained in an inactive state at least once per week. The company might formulate a further constraint to maximize profit by limiting electrical generation through requiring that at least five generators remain inactive at all times. In this example, it is simple to see that the where the company has ten total generators, the requirements of five inactive generators and six active generators (three per plant for each of two plants) cannot be met simultaneously. Thus, it is easy to determine that this model is infeasible.

However, in models involving tens, hundreds, thousands, or ten thousands of variables or constraints, making an infeasibility determination may be much more difficult. In such models, a known approach to finding errors leading to infeasibility is to reduce the infeasibility to a relatively small set of constraints. This approach is routinely employed for continuous models. However, due to the prohibitive resource cost of identifying sets of conflicting constraints in integer or mixed integer problems, this approach is not regularly applied to such problems.

It would be desirable to provide improved methods and systems for determining whether MIP models are infeasible. It would further be desirable to provide less costly methods and systems for identifying relatively small sets of constraints that make MIP models infeasible.

Further, while it is known and desirable to one of ordinary skill to create feasible models, applicants are not aware of suggestions by others to improve upon the objective function by deliberately creating infeasibilities in a model.

Accordingly, it would be desirable to provide methods and systems for deliberately attempting to create one or more infeasibilities in a model in an effort to improve upon the objective function. It is further desirable to provide methods and systems for identifying relatively small sets of constraints that may be limiting an objective function, in order that the modeler may consider whether such constraints may or should be changed to improve the overall result of the model.

In the context of MIPs, a conflict is a set of mutually contradictory constraints and bounds within a model that renders the MIP infeasible. A minimal conflict is such a conflict that is minimal in that removal of any single constraint within the set will eliminate the infeasibility in the set. Removal of this single constraint may or may not render the entire model feasible.

In linear programs (LP), minimal conflicts are known as irreducibly inconsistent sets (IIS). Detection of an IIS among the constraints of a model involves standard methodology known in the field. For example, some techniques for IIS detection are described in an article by John Gleeson and Jennifer Ryan, titled "Identifying Minimally Infeasible Subsystems of Inequalities." Further, an IIS finder has been included in software sold by Ilog, Inc. of Mountain View, Calif., under the name ILOG CPLEX. However, a conflict in terms of MIPs is more general than just IIS. IIS is understood to be strictly related to continuous LP models, while conflicts of the type discussed herein may include mixed integer models or models containing quadratic elements. Thus, application of IIS detection to MIPs is made through the relaxation of MIP integrality restrictions by which a LP is derived.

If a model contains only one conflict, removal of the lone conflict results in feasibility. Whereas, if the model contains multiple conflicts, removal of a single conflict will not result in feasibility. For example, the simplified generator example above contains only one explicit conflict which happens to be a minimal conflict. In that model, removal of either the three generators active per plant constraint or the five generators inactive constraint would eliminate the explicit infeasibility in the model. In another example, a model may contain the following set of constraints:

$y > x+1$
$z > y+1$
$a > z+1$
$x > a+1$

Again, in this example, it is easy to determine that a conflict exists, rendering the model infeasible. It is also easy to determine that this set of constraints contains a minimal conflict. Removal of any of the four constraints would allow a feasible solution.

However, in more complex models it may be very difficult to quickly determine that one or more conflicts exists. Where resources are limited, it may be impossible to determine that conflicts exist in any complex model.

Many scheduling and routing models are too difficult for mathematics. To be more precise, mathematical programming (MP) techniques based on linear algebra (the most common technique for optimization of schedules and plans) break down on most large routing and detailed scheduling problems.

For such situations, a second optimization technology called constraint programming (CP), aimed at solving difficult scheduling and routing problems, was developed. Constraint programming is an emergent software technology for declarative description and effective solving of large, particularly combinatorial, problems usually in the areas of planning and scheduling. Although math is used to help find the correct search path among many choices, CP is not fundamentally based on advanced mathematics. CP is based primarily on computer science-logic programming, graph theory and artificial intelligence efforts.

CP's approach to optimization is different from MP. CP finds efficient solutions (feasible combinations of resource assignments and activities with good utilization) in problems with too many individual constraints regarding sequence and timing for MP. CP is useful when dealing with the complexity of many real problems. For example, CP is useful for scheduling people, machines, or process steps; dispatching trucks delivering freight; and dispatching technicians installing cable service, where the operating constraints and business rules are too complex for mathematics.

CP systematically eliminates possible solutions in order to rapidly identify feasible solutions that can be optimized. Thus, CP allows direct modeling of complex problems (e.g., scheduling or routing), where MP requires a linearization of the problem.

As with MP, a CP model is expressed in a declarative fashion, using decision variables, constraints and objectives. CP's methodology of modeling revolves around formalizing a problem description. For example, to schedule a large number of resources and activities that respect capacity limitations, sequencing requirements, synchronization and individual delivery time commitments, CP would require steps including: defining activities with information about execution time, sub-activities, resource requirements, alternative resources allowed, precedence requirements, costs, etc.; defining resources that have capacities, costs and capabilities that can be required, consumed or shared by certain activities, and produced by others; balancing sometime conflicting business goals; tracking resource utilization, consumption and available capacity; tracking time to be able to sequence activities and respect time windows when activities must occur; controlling the possible values for each decision variable; and reducing the possible values for a decision variable as other variables are determined.

In this example, three concepts are fundamental to the way constraint programming generates workable schedules from such a model. The first concept is the manner in which CP handles time. MP can divide time into buckets and decide what is optimal for each bucket. However, MP can be less adequate when computing the optimal sequence of large numbers of inter-related activities with a start time for each. CP, for example, can determine the best sequence of activities that satisfy capacity limitations, set-up times, maintenance requirements, availability restrictions, and individual delivery due dates. The second major concept offered by CP is domain reduction. Domain reduction is the internal mechanism that makes difficult scheduling problems manageable (i.e., every resource or activity to be scheduled has a certain number of possible values that can be systematically reduced until a solution is reached). Every domain reduction makes the problem easier. Reducing the size of the search space is a concept found in both MP and CP, but each goes about it differently. CP has fewer limitations than MP on its ability to work with non-linear constraints. The third concept relates to the second: CP incorporates the notion of systematically exploring a decision tree for feasible and efficient solutions. One benefit of this structured approach is the ability to move flexibly throughout the search space and to backtrack when early choices turn out to be dead-ends.

(Constraint Programming is used in software sold by ILOG, Inc. of Mountain View, Calif. under the name ILOG Constraint Programming.)

In constraint programming, conflicts (either minimal or non-minimal) are known as "explanations."

In many cases, constraints are used actively to reduce domains by filtering values that cannot take part in any solution. This process is called constraint propagation, domain filtering, pruning, or consistency technique. Constraint propagation may be used to fully solve problems. However, this is rarely done due to efficiency issues. It is more common to combine an efficient albeit incomplete consistency technique with non-deterministic search. This consistency technique does not remove all inconsistent values from the domain of constraint variables. Yet, the technique can eliminate many obvious inconsistencies, thereby simplifying the problem and reducing the search space.

Many theoretical consistency techniques are known, including: node consistency, arc consistency (including AC-1, AC-2, AC-3, AC-4, AC-5, AC-6, and AC-7 algorithms), path consistency, restricted path consistency, k-consistency, (i,j)-consistency, inverse consistency, and singleton consistency. Overviews of these and other techniques are briefly described by Roman Bartak in an article titled, "Theory and Practice of Constraint Propagation."

With respect to MIP (including LP), the equivalent of constraint propagation is called "bound strengthening" (BS). A simple example of BS is found in the following example. Assume a problem with variables x and y. Both variables have zero as lower bound and no upper bound. The problem includes a constraint $x+2y=1$. From this information, one can infer that x must have an upper bound of 1 and y must have an upper bound of ½. By making this inference, the defined bounds of infinity on both x and y have been strengthened. In a variation of this example, if y is defined as an integer variable, y could be rounded down to 0, as the upper bound (i.e., ½) is non-integer. In this manner, bound strengthening accounts for integrality constraints.

Strengthened bounds on a subset of variables may allow strengthened bounds on other variables. In this example, if the upper bound of x is strengthened to ½, the lower bound of y must be strengthened from zero to ¼, to satisfy the constraint $x+2y=1$. This type of bound strengthening process may result in very long sequences of minute bound tightenings. Thus, the process is often interrupted when some resource limit is reached. An interruption of this type may cause non-monotonicity in the infeasibility detection.

Infeasibility may be detected through BS when the lower bound of a variable is tightened to a larger value than its upper bound.

Presolve techniques transform a MIP into an equivalent MIP that is easier to solve. When a problem has been presolved, one can easily generate a solution to the original MIP from a solution of the presolved MIP. BS is often employed as part of presolve. A discussion of several known presolve methods is set forth by Jacek Gondzio in an article titled, "Presolve Analysis of Linear Programs Prior to Applying an Interior Point Method." Gondzio explains that it has been known, almost since the first applications of LP, that presolve analysis of the problem before passing it to a solver often reduces solution time considerably. Accordingly, it is understood that one of ordinary skill in the art will be familiar with presolve techniques.

Ulrich Junker of Ilog, S.A., teaches an algorithm named QuickXplain in an article titled, "QuickXplain: Conflict Detection for Arbitrary Constraint Propagation Algorithms." Junker explains that at the time of his article, existing conflict detection methods for constraint satisfaction problems (CSPs) could not make use of powerful propagation, which made them unusable for complex real-world problems. Likewise, Junker explained that powerful constrain propagation methods lacked the ability to extract dependencies or conflicts. Accordingly, Junker proposed QuickXplain to overcome such problems by recursively partitioning the problem into subproblems of half the size and immediately skipping the subproblems that do not contain an element of the conflict.

Junker distinguishes propagation-specific conflicts from global conflicts, noting that not each global conflict is propagation-specific. Junker teaches that it is possible to detect conflicts a posteriori for any constraint propagation algorithm as complex as it may be. Given a set of inconsistent constraints, the basic idea is to iteratively test the consistency of subsets of the given constraints until a minimal conflict is found. Junker notes that the existing conflict detection methods need $O(n \cdot k)$ consistency tests to find a minimal conflict of size k out of n constraints. Junker teaches an improvement over such methods by recursively partitioning the conflict detection problem into subproblems of half the size and immediately skipping those subproblems that do not contain an element of the conflict. QuickXplain needs O(n·log(k+1)+k²) consistency tests. Thus, QuickXplain is more efficient if k is small compared to n.

In illustrating QuickXplain, Junker proposes the following simple example, which contains a conflict that is easy to detect. Suppose a customer wants to buy a station wagon with the following extras: 1. metal color, 2. ABS, 3. roof racks, 4. one additional seat, 5. special luxury version. Suppose that those extras cost $c_1:=\$500$, $c_2:=\$500$, $c_3:=\$500$, $c_4:=\$800$, and $c_5:=\$2600$. Suppose that the customer cannot exceed $3000 for the extras. The example is modeled with a constrained integer variable $x_i \in \{0,1\}$ for each extra i:=1, ..., 5, a variable $y \in [0,3000]$ for the costs of the extras, and the following constraint:

$$y = \sum_{i=1}^{5} c_i \cdot x_i$$

The customer requests are modeled by the constraints $x_i=1$ for each i=1, ..., 5.

Junker explains that existing algorithms could return a conflict explanation of the form $X:=\{p_1, p_2, p_3, p_4, p_5\}$. However X is not a minimal conflict. If $p_5$ is chosen, no other extra can be chosen without violating the $3000 budget. Thus, the example contains four possible minimal conflicts $\{p_1,p_5\}$, $\{p_2,p_5\}$, $\{p_3,p_5\}$, and $\{p_4,p_5\}$, which are significantly smaller than X.

QuickXplain finds minimal conflicts by first adding the given constraints $p_1, \ldots, p_5$ in a given order to a constraint propagation engine until a failure state is obtained. In the example, the first failure occurs after $p_5$ is added. Consequently, $p_5$ belongs to some minimal conflict. After obtaining a failure, the propagation engine backtracks to the initial state and adds $p_5$ again. Because adding $p_5$ does not result in a failure, the remaining constraints $p_1, \ldots, p_4$ are added one at a time until a failure occurs. Addition of the first constraint, $p_1$, immediately causes a failure because $2600+$500>$3000. Thus, a minimal conflict $\{p_1,p_5\}$ is found.

Junker considers a slightly more complex variant of the example. It includes eight requests for extras $p_1, \ldots, p_8$ with costs $c_1=c_3=c_4=c_6=\$100$ and $c_2=c_5=c_7=c_8=\$800$. The scalar product is adapted to correspond to these requests and costs, but the budget remains $3000. The existing algorithm needed 26 steps to determine a minimal conflict. While QuickXplain needs only 21 steps.

In this example, QuickXplain begins by adding the constraints iteratively until the first element of the conflict is detected on addition of $p_8$ (8 steps). The problem is then decomposed into two subproblems. The first subproblem consists of finding a conflict among $\{p_5, \ldots, p_7\}$ while keeping $\{p_1, \ldots, p_4\}$ and the already detected elements of the conflict in the background as hard constraints. In this example, $p_8$ is initially kept in the background with the first half of the constraints $\{p_1, \ldots, p_4\}$. To set up this first subproblem, Junker explains that QuickXplain backtracks three steps and re-adds the already detected element of the conflict (i.e., $p_8$) to the background (1 step). QuickXplain then reads the constraints $\{p_5, \ldots, p_7\}$ until a failure is detected on addition of $p_7$ (3 steps). QuickXplain again backtracks and re-adds the already detected elements of the conflict (i.e., $p_7$ and $p_8$) to the background (1 step). QuickXplain then reads the constraints $\{p_5, \ldots, p_6\}$ until a failure is detected on addition of $p_5$ (1 step). QuickXplain again backtracks and re-adds the already detected elements of the conflict (i.e., $p_5$, $p_7$ and $p_8$) to the background (1 step). QuickXplain obtains a failure at this point. Thus, QuickXplain has detected three elements of the conflict, i.e., $p_5$, $p_7$ and $p_8$. At this point, QuickXplain sets up the second subproblem. QuickXplain backtracks to the beginning and re-adds all of the detected elements of the conflict (3 steps). QuickXplain then adds the original background constraints from the first half of the problem $\{p_1, \ldots, p_4\}$ until a failure is detected on addition of $p_2$ (2 steps). QuickXplain again backtracks and re-adds the already detected elements of the conflict (i.e., $p_2$) to the background (i.e., $p_5$, $p_7$ and $p_8$) (1 step). QuickXplain obtains a failure at this point. In this manner, QuickXplain detects the first (and, in this example, only) minimal conflict.

Junker explains that QuickXplain can be supplied with a CSP (C,U) in explainable form and determine a conflict for it if $\Pi(C \cup U)$ contains an inconsistency $\perp$. Otherwise, QuickXplain throws an exception indicating that there is no conflict. QuickXplain consists of an exploration phase in which the unexplored constraints in U are step-by-step added to C by using the function add of the underlying constraint propagation engine. Junker lets $\alpha_1, \ldots, \alpha_n$ be the order in which the constraints are added. The first $\alpha_k$ that causes a failure when added to C belongs to a minimal Π-conflict. Thus, that $\alpha_k$ is added to X and its addition to C is undone. With this background, Junker provides an algorithm for QuickXplain:

---
Algorithm QUICKXPLAIN(C, U)
---
1. if $\perp \in C$ then return ∅;
2. if U = ∅ then throw exception 'no conflict';
3. let $\alpha_1,\ldots,\alpha_n$ be an enumeration of U;
4. k := 0;
5. while $\perp \notin C$ and k < n do
6.     $C_k := C$;
7.     k := k + 1;
8.     $C := \Pi(C \cup \{\alpha_k\})$;
9. if $\perp \notin C$ then throw exception 'no conflict';
10. X := $\{\alpha_k\}$;
11. let i be split(k − 1);
12. $U_1 := \{\alpha_1,\ldots,\alpha_i\}$;
13. $U_2 := \{\alpha_{i+1},\ldots,\alpha_{k-1}\}$;
14. if $U_2 \neq$ ∅ then
15.     $C := C_i$;
16.     $C := \Pi(C \cup X)$;
17.     let $\Delta_2$ be the result of QUICKXPLAIN(C, $U_2$);
18.     X := $\Delta_2 \cup X$;
19. if $U_1 \neq$ ∅ then
20.     $C := C_0$;
21.     $C := \Pi(C \cup X)$;
22.     let $\Delta_1$ be the result of QUICKXPLAIN(C, $U_1$);
23.     X := $\Delta_1 \cup X$;
24. return X.

In this algorithm, when an element $\alpha_k$ of X is detected, the remaining constraints are divided into two disjoint subsets $U_1:=\{\alpha_1, \ldots, \alpha_i\}$ and $U_2:=\{\alpha_{i+1}, \ldots, \alpha_{k-1}\}$ where i:=split (k−1). Usually, the split is in the middle and split(n):=n/2 is chosen. Then, the algorithm is recursively applied to find a conflict $X_2$ among $U_2$ using $C \cup U_1$ as the background and a conflict $X_1$ among $U_1$ using $C \cup U_2$ as the background. (As explained by Junker, the "background" contains the subset that is not currently being tested for conflicts and the already identified elements of the minimal conflict. Thus a "background" constraint may or may not be part of a conflict.) Then, the set $X:=X_1 \cup X_2 \cup \{\alpha_k\}$ is a minimal Π-conflict for (C,U).

According to the algorithm, QuickXplain immediately skips a subproblem if the background of the subproblem is inconsistent. Thus, only subproblems containing elements of X will be explored. Hence, k subproblems will be explored in total. This leads to a maximum of n·log(k+1) add calls for exploration. To count the add calls needed for testing the elements of X, Junker looks at the depth of the recursive calls of QuickXplain. Each time a new element of X is detected, the call depth can be increased. Thus, the i-th element of X is detected at depth i or less. The algorithm tests twice when detected (at lines 16 and 21) and once at smaller depths (at line 21). Thus, the algorithm requires a maximum of $$\sum_{i=1}^{k}(i+1)=(k+3)\cdot k/2$$

tests. (Junker notes that the QuickXplain algorithm is used as the explanation component of an advanced industrial constraint-based configuration tool sold by ILOG, Inc. of Mountain View, Calif. under the name ILOG Configurator.)

Junker also proposes three extensions of QuickXplain. First, he proposes application of QuickXplain in each node of a (systematic and complete) backtrack search for a solution. If all sons of a node fail, use the hyperresolution principle as employed in ATMS in order to compute a conflict that no longer contains constraints added in the son nodes. These conflicts allow use of conflict-based backjumping or dynamic backtracking as the search method. Second, he proposes application of a (systematic and complete) backtrack search for a solution in each step of QuickXplain. Already detected solutions can be maintained internally and serve as starting points for some of the backtrack searches. They can also render some of the backtrack searches obsolete. Third, he proposes interleaving or nesting the first two extensions.

While, it is known and desirable to one of ordinary skill to use the above-described bound strengthening within QuickXplain to identify conflicts, applicants are not aware of suggestions by others to use presolve or complete MIP tree exploration methodology within QuickXplain or other prior art algorithms to test for conflicts in mixed integer programs.

Accordingly, it would be desirable to provide methods and systems for determining the existence of conflicts in models. It would further be desirable to provide methods and systems for identifying sets of constraints containing conflicts in models. It would further be desirable to provide methods and systems for determining the existence of minimal conflicts in models. It would be still further desirable to provide methods and systems for identifying sets of constraints containing minimal conflicts in models. It would be still further desirable to provide methods and systems for using presolve or complete MIP tree exploration methodology to determine the existence of or identify conflicts in models.

SUMMARY OF THE PRESENT INVENTION

It is an objective of the present invention to provide improved methods and systems for determining whether MIP models are infeasible.

It is an objective of the present invention to provide less costly methods and systems for identifying relatively small sets of constraints that make MIP models infeasible.

It is an objective of the present invention to provide methods and systems for deliberately creating one or more infeasibilities in a model in an effort to improve upon the objective function.

It is an objective of the present invention to provide methods and systems for identifying relatively small sets of constraints that may be limiting an objective function, in order that the modeler may consider whether such constraints may or should be changed to improve the overall result of the model.

It is an objective of the present invention to provide methods and systems for determining the existence of conflicts in models.

It is an objective of the present invention to provide methods and systems for identifying sets of constraints containing conflicts in models.

It is an objective of the present invention to provide methods and systems for determining the existence of minimal conflicts in models.

It is an objective of the present invention to provide methods and systems for identifying sets of constraints containing minimal conflicts in models.

It is an objective of the present invention to provide methods and systems for using presolve or complete MIP tree exploration methodology to determine the existence of or identify conflicts in models.

It is an object of the present invention to provide a method by which a conflicts within a MIP model might be identified given one or more resource limitations.

These and other objects of the present invention are accomplished by providing systems and methods for identifying conflicting constraints and bounds within a MIP model.

The present invention generally encompasses a software program operating on a computer including a general purpose microprocessor that implements one or more algorithms for determining the existence of conflicts in models, identifying conflicts in models, or both. It is understood that compiled or uncompiled software programs with the capability to implement algorithms (such as the algorithms listed herein) may be stored on a storage medium that may later be read by or transmitted to a computer. Such media includes optical discs, hard drives, flash memory, floppy discs, computer-scannable paper, and various other media. The present invention encompasses a software program stored on such media, which may later be read by or transmitted to a computer to provide the computer with the capability to implement the algorithms listed herein.

In one embodiment of the invention, one or more artificial constraints are added to a MIP model. The artificial constraints are created in an attempt to deliberately render the model infeasible. Conflicts created by the artificial constraints are then identified, allowing for possible refinement of non-artificial constraints to improve upon the optimal value of the objective function.

In another embodiment of the invention, presolve is used in connection with a conflict detection algorithm to determine the existence of a conflict within a MIP model.

In yet another embodiment of the invention, presolve is used in connection with a conflict detection algorithm to identify conflicting constraints within a MIP model.

In another embodiment of the invention, a complete MIP tree exploration algorithm is used in connection with a conflict detection algorithm to determine the existence of a conflict within a MIP model.

In yet another embodiment of the invention, a complete MIP tree exploration algorithm is used in connection with the QuickXplain algorithm to identify conflicting constraints within a MIP model.

In another embodiment of the invention, a conflict detection algorithm uses bound strengthening and presolve to detect conflicting constraints within a MIP model. If either algorithm detects a conflict, a conflict identification algorithm is executed to identify a set of conflicting constraints. Or, if neither bound strengthening nor presolve detects conflicting constraints, a standard IIS finder may be used on the LP relaxation in an attempt to identify a set of conflicting constraints. A complete MIP tree exploration algorithm may then be applied to the identified set of conflicting constraints to reduce the conflict to a minimal conflict.

DETAILED DESCRIPTION OF THE INVENTION

Figure 1:
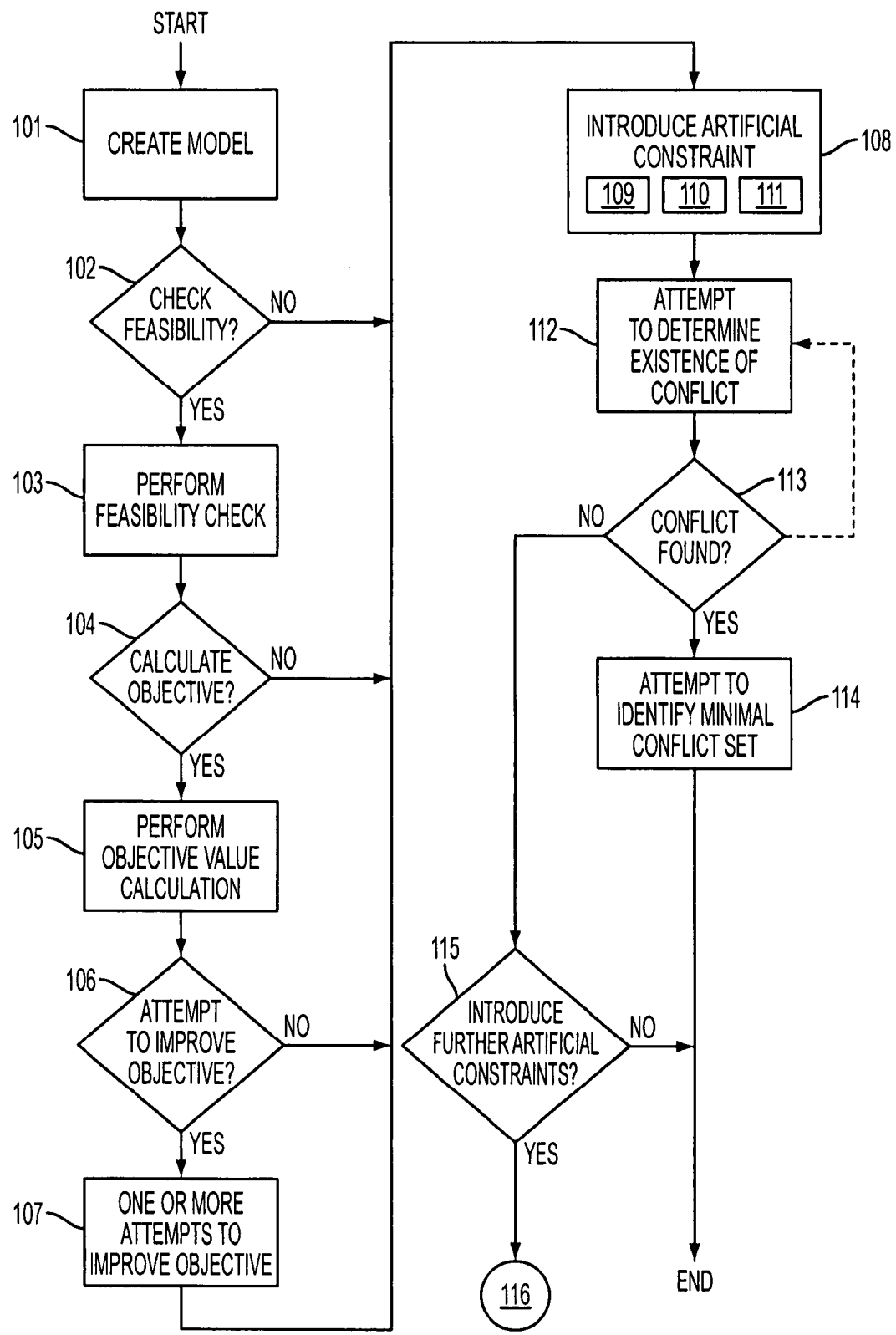
FIG. 1 shows a flow chart illustrating the steps that may be performed in one embodiment of the invention.

A novel manner in which infeasibilities in models may arise is through the deliberate creation of one or more infeasibilities. In such a method, one or more constraints that deliberately render the model infeasible are added after the model is partially or fully created. This allows for testing of whether the infeasibility is due to only one or multiple conflicts. It also allows for testing the degree of such conflicts by determining whether the constraint creates many conflicts, few conflicts, or even one or more sets that contain a minimal conflict. This testing may be accomplished by application of the identification methods described herein, by other known identification methods, or by identification methods which may be developed in the future. As such, the invention is not limited to currently available methods for identification.

One preferred example of introducing such an infeasibility is to add a constraint to the model that requires the objective function to be better than its current optimal value (whether the optimal value is the absolute optimal solution or a best known solution). This introduction of such a constraint may be followed by application of constraint identification techniques. For example, the QuickXplain algorithm might be applied. When a conflict is identified, the modeler is likely to better know which constraints are limiting the optimal value. If a minimal conflict is identified, the modeler will be able to identify constraints that directly limit the optimal value of the objective function.

One important result of the application of MIP techniques within the QuickXplain algorithm is that the application enables the inclusion of variable bounds. CP technology known to applicants does not properly handle unbounded variables. However, removal of variable bounds is a necessary part of testing which bounds contribute to a conflict. This necessary removal of variable bounds is not possible within CP.

With respect to the above example related to a station wagon purchase wherein $C_5=\$2600$, an example of introducing artificial infeasibility might be the combination of constraints wherein all five extras are required and "the customer cannot exceed $3000 for the extras." Having both such constraints allows for identification of $p_5$ in each of four minimal conflicts. If the example were formulated such that only four extras were needed, the model would be feasible by setting $x_5=0$. Similarly, if all five extras were needed, but the customer was allowed a budget of $4900, the model would be feasible. Further, if only two extras were needed, i.e. the model required:

$$\sum_{i=1}^{5} x_i \cdot 2$$

the model would be feasible with several possible solutions. By these examples, it can be seen that the introduction of artificial constraints which render the model infeasible may allow for identification of non-artificial constraints that are more likely to constrain the optimal value of the objective function.

Such identification may allow a MIP modeler to easily create a model resulting in a better optimal value of the objective function. For example, a business manager might be able to identify and change a business strategy that is unnecessarily restrictive.

It will be understood by one of ordinary skill in the art that introduction of various types of artificial constraints can be implemented to search for or identify various types of non-artificial constraints that limit the optimal value of the objective function. Such constraints may be specific to a particular problem. This specificity should not limit the application of the method described herein.

It will also be understood that the optimal value of the objective function may be impacted by various types of constraints particular to a model. The modeler may wish to search for particular type of constraint that might be limiting the objective function, without implicating other types of constraints in an artificially created conflict.

For example, a fleet scheduling model may include constraints directed to vehicles, roads, drivers, salaries, dispatchers, fuel, time, etc. A general artificial constraint directed strictly to the optimal value of the objective function might implicate a very large minimal conflict. In such an model, it might be preferable to introduce an artificial constraint directed solely to one of the types constraints, e.g. drivers, to determine whether that type of constraint is unduly limiting to the optimal value of the objective function. For instance, if a model limits both the number of drivers and the number of vehicles and the economic possibility of hiring or firing additional drivers is favorable to the modeler, the modeler may wish to search for a possible conflict in constraints related to drivers. In such an instance, the modeler may wish to introduce and test one or more artificial constraints more closely related to drivers than to fuel or roads. Application of conflict identification algorithms may then reveal a strategic change that can be undertaken with respect to drivers that will allow for realization of a better optimal value of the objective function.

Referring now to FIG. 1, a flow chart illustrating the steps that may be performed during one iteration of the method is shown. In step 101, a model of a combinatorial optimization problem is created. In step 102, it is determined whether to check for feasibility of the model. If a feasibility check is not to be performed, the flow proceeds to step 108. If a feasibility check is to be performed, the flow proceeds to step 103. In step 103, a partial or full check for feasibility of the model is performed. If the model is not feasible, the flow may proceed to step 104 or terminate. If the flow proceeds, it may contain an infeasible model or allow an opportunity to amend the model in an attempt to make the model feasible. If the model is amended, flow may return to step 102 (not shown in the figure). From step 103, flow proceeds to step 104. At step 104, it is determined whether to calculate at least one value of the objective function. If an objective function value is not to be calculated, flow proceeds to step 108. If an objective function value is to be calculated, flow proceeds to step 105. In step 105, an objective function value is calculated. Flow then proceeds to step 106. In step 106, it is determined whether to attempt to improve the objective function value determined in step 105. If no attempt to improve the objective function value is to be made, flow proceeds to step 108. If an attempt to improve the objective function value is to be made, flow proceeds to step 107. In step 107, one or more attempts to improve the objective function value are made. Step 107 may include one or more attempts to seek an optimal value of the objective function, whether provably optimal or not. After completion of step 107, flow proceeds to step 108.

In step 108, one or more artificial constraints (referred to in the singular in this discussion) are introduced. The artificial constraint may be created in an attempt to create a conflict 109. For example, if a provably optimal objective function value has been found, a constraint requiring an improvement 110 over the provably optimal objective function value may be introduced. By definition, this will create a conflict 109. The artificial constraint may introduce a conflict 109 without requiring an improvement of a known objective function value. The artificial constraint introduced at step 108 may require an improvement 110 over a best known objective function value, whether or not the best known objective function value is provably optimal or not. The artificial constraint introduced at step 108 may be formulated in an attempt to implicate or create a conflict in a particular portion 111 of the model. While such an attempt to create conflict in a particular portion 111 of the model may be unsuccessful, even by a directed attempt to do so, the artificial constraint may be valuable for locating conflicts in other portions of the model. Thus, the artificial constraint introduced in step 108 may include none, all, or any subset of properties 109, 110, and 111.

After the artificial constraint is introduced, the flow proceeds to step 112. In step 112, a full or partial attempt to determine the existence of one or more conflicts is performed. Flow then proceeds to step 113. It will be understood that, if a partial attempt to determine the existence of a conflict was undertaken at step 112, and no conflict was found in step 112, the flow may proceed from step 113 back to step 112 for a further search for a conflict. If a conflict was found in step 112, flow proceeds from step 113 to step 114. If a conflict was not found in step 112, flow proceeds from step 113 to step 115. In step 114, one or more full or partial attempts to identify one or more full or partial minimal conflict sets are performed. After performance of step 114, the flow may be directed as desired. At the completion of step 114, it is likely that the method will have generated information with some value in determining whether the model should be adjusted to achieve an advantage.

In step 115, a determination is made whether to introduce further artificial constraints. If no further artificial constraints are to be introduced, the flow may be directed as desired. If a further artificial constraint is to be introduced, flow proceeds to step 116. From step 116, the flow may be directed to step 108 or any of the steps preceding step 108. The direction of flow from step 116 may be automatic or determined in whole or in part by the person or entity performing the method. It will be understood that returning from step 116 to steps 106 or 107 should not be undertaken unless an objective value has been determined prior to entering step 106 or step 107.

It will also be understood that the manner of proceeding at any of decision steps 102, 104, 106, and 115 may be determined prior to or after entering the flow.

Conflict refining is a method by which feasibility can be tested and conflicts may be identified in a manner that expends fewer resources. One method of conflict refining extends the QuickXplain algorithm by testing feasibility through methods other than BS. For example, some or all of BS, presolve, and complete MIP tree exploration (e.g., branch-and-cut or branch-and-bound) may be used. BS and presolve are not deterministic algorithms, but are used heuristically. While a heuristic method is often intuitively justifiable, it may not produce an optimal result or even a good result. In the instance of conflict determination and identification, a heuristic method can often identify a potential conflict, but cannot prove whether the set is infeasible. Likewise, a heuristic method cannot prove whether the conflict is a minimal conflict. It is also possible that BS and presolve could each identify a set of conflicting constraints but fail to identify a superset of that set as infeasible. With such a failure, the non-monotonicity would lead to failure of QuickXplain, if QuickXplain was applied.

Only a complete MIP tree exploration results in a provably minimal conflict. However, complete MIP tree exploration often consumes more resources than desired.

To address these problems with conflict refining and resource depletion, applicants devised methods employing a hierarchical approach to conflict refining. This approach is designed to find relatively smaller conflicts using relatively few resources (e.g., BS or presolve) and detect minimal conflicts using relatively few resources (e.g., application of complete MIP tree exploration after BS or presolve) when compared to known methods (e.g., independent application of complete MIP tree exploration).

In a preferred embodiment, the method first attempts to detect infeasibility using BS, presolve, or both. If either BS or presolve detects infeasibility, QuickXplain is employed to identify a smaller set of conflicting constraints. However, if BS and presolve do not detect infeasibility, an IIS detection technique (such as the Ilog IIS finder described above) is used on the LP relaxation of the MIP to attempt to detect and identify a set of conflicting constraints. A complete MIP tree exploration may then be applied to the set of constraints identified by these techniques.

While it would be difficult or impossible to test this method on all MIPs, the method appears to provide advantages over known techniques in many MIPs. For example, BS, presolve, or IIS detection techniques are frequently able to reduce the initially identified set of conflicting constraints. Thus, the set of conflicting constraints identified through application of the hierarchical method described herein is often reduced such that it is not much larger than the minimal conflict. In many cases, this reduction of the set of conflicting constraints allows for a less resource intensive complete MIP tree exploration than would otherwise be possible.

Figure 2:
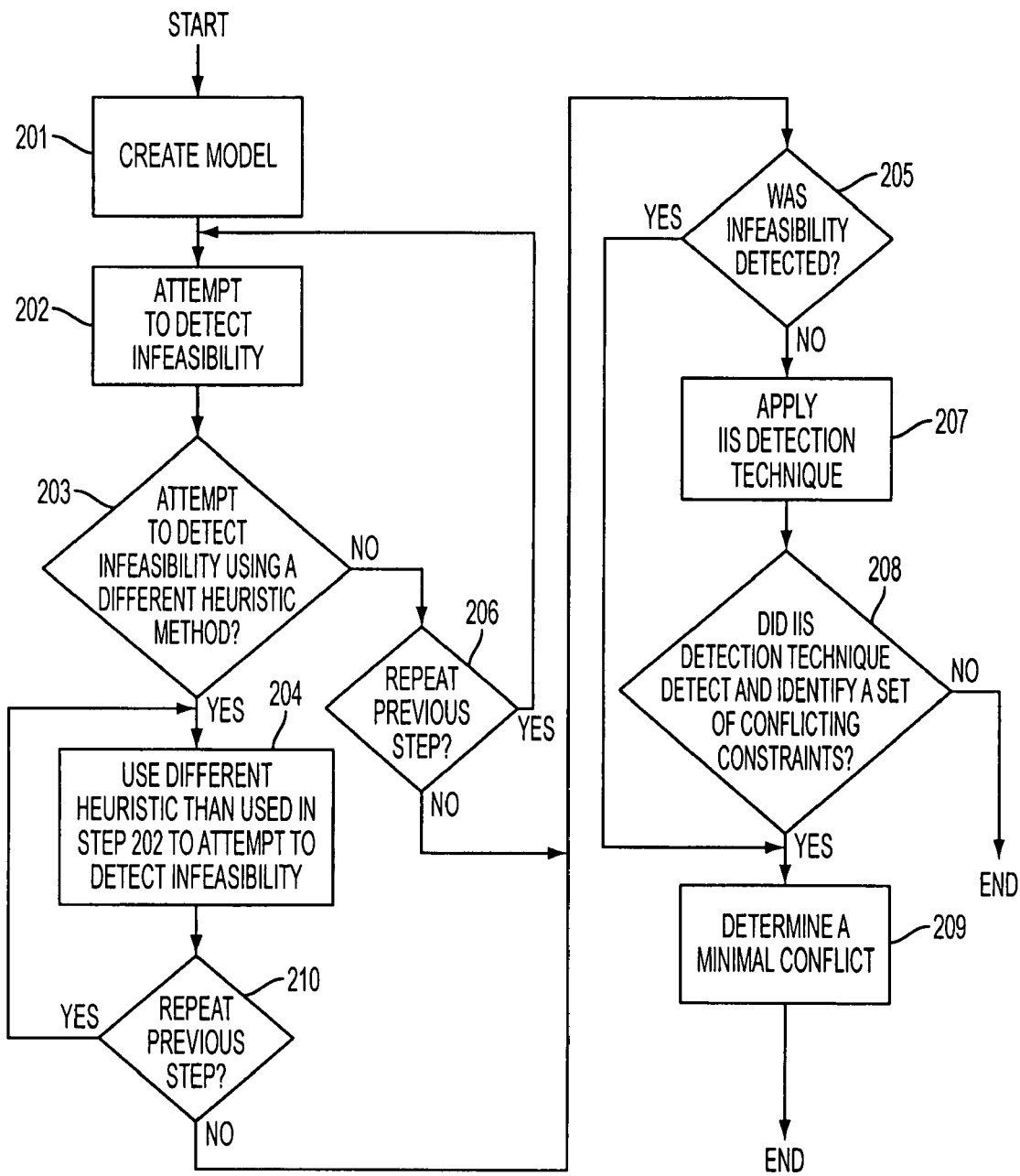
FIG. 2 shows a flow chart illustrating the steps that may be performed in one embodiment of the invention.

Referring now to FIG. 2, a flow chart illustrating the steps that may be performed during one iteration of the method is shown. In step 201, a model of a combinatorial optimization problem is created. In step 202, an attempt is made to detect infeasibility of the model created in step 201, using a heuristic method such as BS or presolve. The amount of resources to be expended in step 202 may vary. Flow then proceeds to step 203.

In step 203, a determination may be made as to whether to attempt to detect infeasibility of the model using a different heuristic method (e.g., if presolve was initially used in step 202, it may be desirable to use BS as well). If it is determined to attempt a different heuristic method, flow proceeds to step 204. If it is determined at step 203 not to attempt a different heuristic method, flow proceeds to step 206. In step 206, a determination is made whether to repeat step 202. The determination of step 206 might be dependent on whether infeasibility was detected in step 202. If it is determined in step 206 to repeat step 202, flow returns to step 202, where a heuristic method is used to attempt to detect infeasibility. If it is determined in step 206 not to repeat step 202, flow proceeds to step 205.

In step 204, an attempt is made to detect infeasibility of the model created in step 201, using a different heuristic method than that used in step 202. The amount of resources to be expended in step 204 may vary. Flow then proceeds to step 210. In step 210, a determination is made whether to repeat step 204. The determination of step 210 might be dependent on whether infeasibility was detected in step 204. If it is determined in step 210 to repeat step 204, flow returns to step 204, where a heuristic method is used to attempt to detect infeasibility. If it is determined in step 210 not to repeat step 204, flow proceeds to step 205.

In step 205, a determination is made as to whether infeasibility was detected by the heuristic methods of either of steps 202 or 204. If neither of steps 202 or 204 detected infeasibility, the flow proceeds to step 207. If either or both of steps 202 or 204 detected infeasibility, then flow proceeds to step 209.

In step 207, an IIS detection technique is applied to the LP relaxation of the model. The IIS detection technique attempts to detect and identify a set of conflicting constraints in the model. Flow then proceeds to step 208. In step 208, a determination is made as to whether step 207 detected and identified a set of conflicting constraints. If step 207 detected and identified a set of conflicting constraints, flow continues to step 209. If step 207 did not detect and identify a set of conflicting constraints, flow may be directed as desired.

In step 209, a complete MIP tree exploration is applied to the set of identified conflicting constraints, to determine a minimal conflict in the model. Following determination of one or more minimal conflicts in the model, flow may be directed as desired.

Figure 3:
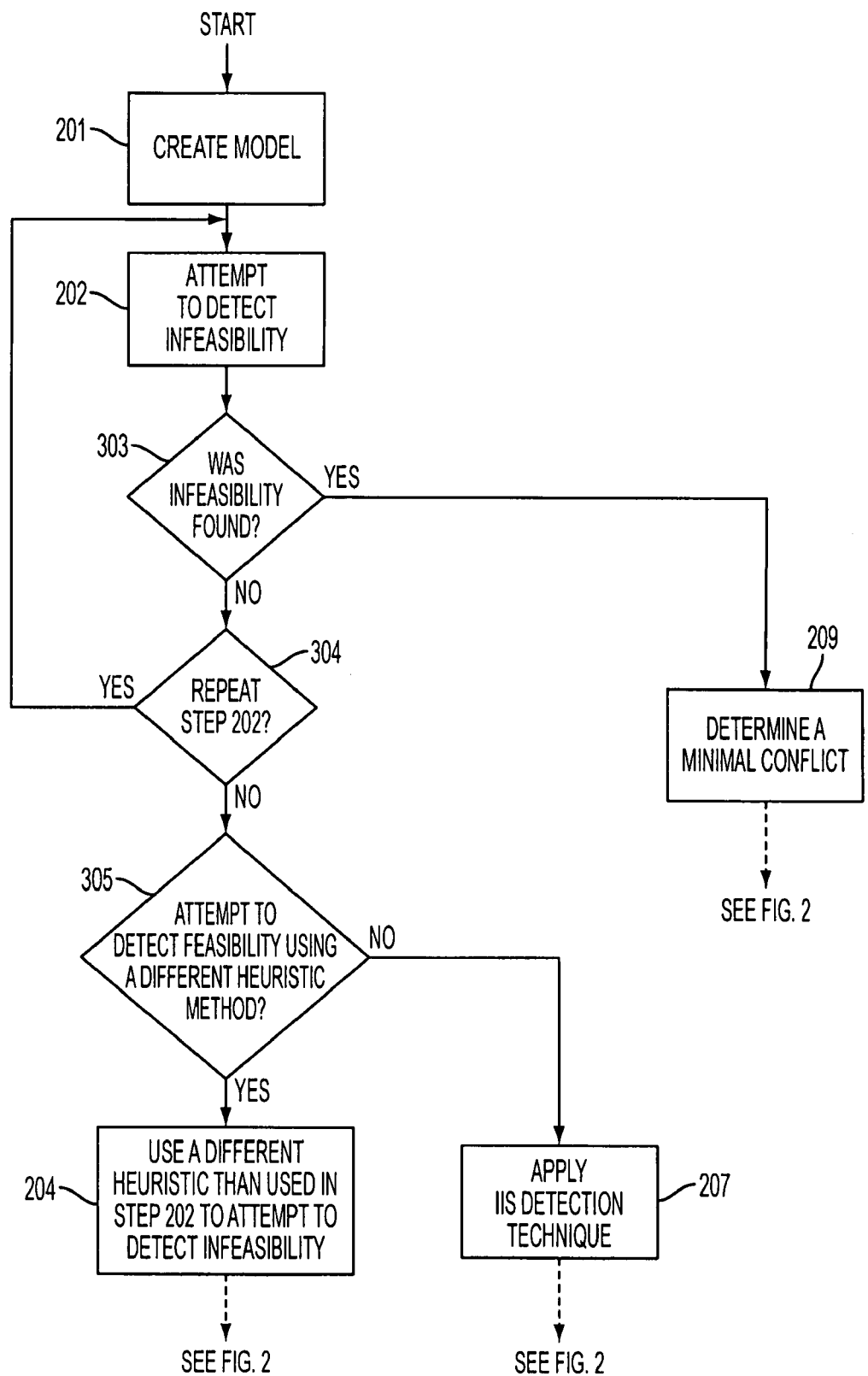
FIG. 3 shows a flow chart illustrating alternate steps that may be substituted for a portion of FIG. 2.

In an alternative to a portion of the flow, shown in FIG. 3, step 203 and its dependent step 206 might be replaced with the steps shown in FIG. 3. In step 303, it may be determined whether an infeasibility was found in step 202. If an infeasibility was found, flow may proceed to step 209. If an infeasibility was not found, flow may proceed to step 304. In step 304, it may be determined whether to attempt to repeat step 202. If it is determined to repeat step 202, flow returns to step 202. If it is determined not to repeat step 202, flow may proceed to step 305. In step 305, it may be determined whether to attempt a different heuristic method. If it is determined to attempt a different heuristic method, flow proceeds to step 204. If it is determined not to attempt a different heuristic method, flow may proceed to step 207.

It should be understood that the flows between steps 202 and 204 and their respective branchings may be repeated after step 204, with appropriate re-routing, if it is desirable to repeat step 204 or attempt yet another heuristic method of determining an infeasibility.

One system employing an embodiment of the conflict refining method set forth herein is the Conflict Refiner feature of CPLEX version 10.0 software available from Ilog, Inc. of Mountain View, Calif. This conflict refiner is capable of detecting and identifying infeasible subproblems and provably infeasible models in MIPs. Where an infeasible model with more than one possible conflict is input, the conflict refiner may be directed to attempt to detect a conflict in a particular portion of the problem before searching in other portions.

The following is an example of using the Conflict Refiner in CPLEX to employ one embodiment of the methods set forth herein:

BEGIN EXAMPLE

This example presents a simplified resource allocation problem to use as a model in the Interactive Optimizer. One may create a file containing the lines set forth below and read the file into the Interactive Optimizer by means of the command: read filename. Or, one may use the enter command, followed by a name for the problem, followed by the lines:

Minimize
   obj: cost
Subject To
   c1: −cost+80 x1+60 x2+55 x3+30 x4+25 x5+80 x6+60 x7+35 x8+80 x9+55 x10=0
   c2: x1+x2+0.8 x3+0.6 x4+0.4 x5>=2.1
   c3: x6+0.9 x7+0.5 x8>=1.2
   c4: x9+0.9 x10>=0.8
   c5: 0.2 x2+x3+0.5 x4+0.5 x5+0.2 x7+0.5 x8+x10−service=0
   c6: x1+x6+x9>=1
   c7: x1+x2+x3+x6+x7+x9>=2
   c8: x2+x3+x4+x5<=0
   c9: x4+x5+x8<=1
   c10: x1+x10<=1
Bounds
   service>=3.2
Binaries
   x1 x2 x3 x4 x5 x6 x7 x8 x9 x10
End This simple model, for example, might represent a project-staffing problem. In that case, the ten binary variables could represent employees who could be assigned to duty.

The first constraint defines the cost function. In this example, the objective is to minimize the cost of salaries. The next three constraints (c2, c3, c4) represent three nonoverlapping skills that the employees must cover to varying degrees of ability. The fifth constraint represents some additional quality metric (perhaps hard to measure) that most or all of the employees can contribute to. It is called customer service in this example. That variable has a lower bound to make sure of a certain predefined minimum level of 3.2.

The remaining constraints represent various work rules that reflect either policy that must be followed or practical guidance based on experience with this work force. Constraint c6, for example, dictates that at least one person with managerial authority be present. Constraint c7 requires at least two senior personnel be present. Constraint c8 indicates that several people are scheduled for off-site training during this period. Constraint c9 recognizes that three individuals are not productive together. Constraint c10 prevents two employees who are married to each other from working in this group in the same period, since one is a manager.

Optimizing the Example

If the optimize command is applied to this example, one will see these results:

Row 'c8' infeasible, all entries at implied bounds.

Presolve time=0.00 sec.

MIP—Integer infeasible.

Current MIP best bound is infinite.

Solution time=0.00 sec. Iterations=0 Nodes=0

Interpreting the Results and Detecting Conflict

The declaration of infeasibility results from presolve. In this example, presolve performed various reductions by the time it detected the unresolvable infeasibility in constraint c8. This information by itself is unlikely to provide any useful insights about the source of the infeasibility, so the conflict refiner may be applied, by entering the command: conflict.

This leads results like these:
Refine conflict on 14 members . . .

| Iteration | Max Members | Min Members |
|---|---|---|
| 1 | 11 | 0 |
| 2 | 9 | 0 |
| 3 | 7 | 0 |
| 4 | 2 | 0 |
| 5 | 2 | 1 |
| 6 | 2 | 2 |

Minimal conflict: 2 linear constraint(s)
  0 lower bound(s)
  0 upper bound(s)
Conflict computation time=0.00 sec. Iterations=6

The first line of output mentions 14 members. This total represents constraints, lower bounds, and upper bounds that may be part of the conflict. There are ten constraints in this model. There are two continuous variables with lower and upper bounds that represent the other four members to be considered. Because binary variables are not reasonable candidates for bound analysis, the CPLEX Interactive Optimizer treats the bounds of only the variables cost and service as potential members of the conflict. If one desired all bounds to be candidates, one could declare the binary variables to be general integer variables with bounds of [0,1]. (Making that change in this model would likely result in the conflict refiner suggesting that one of the binary variables should take a negative value.) On some models, allowing so much latitude in the bounds may cause the conflict refiner to take longer to arrive at a minimal conflict.

Displaying a Conflict

As seen in the log, the conflict refiner narrowed the choices until it arrived at a conflict containing only two members. Since the conflict is small in this simplified example, one could display the entire conflict by entering the command: display conflict all.

This command would result in the output:
Minimize
  obj:
Subject To
  c2: x1+x2+0.8 x3+0.6 x4+0.4 x5>=2.1
  c8: x2+x3+x4+x5<=0
Bounds
  0<=x1<=1
  0<=x2<=1
  0<=x3<=1
  0<=x4<=1
  0<=x5<=1
Binaries
  x1 x2 x3 x4 x5

In a larger conflict, one could selectively display constraints or bounds on variables by using the following commands to specify a range of rows or columns: display conflict constraints, or display conflict variables.

One could write the entire conflict to a file in LP-format by using the command (where modelname is the problem name): write modelname.clp.

Interpreting Conflict

In the above results, one can see that c8, the constraint mentioned by presolve, is indeed a fundamental part of the infeasibility, as it directly conflicts with one of the skill constraints. In this example, with so many people away at training, the skill set in c2 cannot be covered. The modeler might decide, for example, to relax the skill constraint or to reduce the number of people away at training during the period.

Something must be changed for the model to have a feasible solution.

Deleting a Constraint

Assume that a decision is made to cancel the training in the period. To implement that decision, one could enter the command: change delete constraint c8.

Unfortunately, even removing c8 does not make it possible to reach an optimum. Re-optimization after deletion of the constraint still leaves a conflict. Upon re-optimization, CPLEX will display:
Constraints 'c5' and 'c9' are inconsistent.
Presolve time=0.00 sec.
MIP—Integer infeasible.
Current MIP best bound is infinite.
Solution time=0.00 sec. Iterations=0 Nodes=0

Re-application of the conflict command results in the output:
Refine conflict on 13 members . . .

| Iteration | Max Members | Min Members |
|---|---|---|
| 1 | 12 | 0 |
| 2 | 9 | 0 |
| 3 | 6 | 0 |
| 4 | 4 | 0 |
| 5 | 3 | 0 |
| 6 | 3 | 1 |
| 7 | 3 | 2 |
| 8 | 3 | 3 |

Minimal conflict: 2 linear constraint(s)
  1 lower bound(s)
  0 upper bound(s)
Conflict computation time=0.00 sec. Iterations=8

Viewing the entire conflict (with the command: display conflict all) would result in the output:
Minimize
  obj:
Subject To
  c5: 0.2 x2+x3+0.5 x4+0.5 x5+0.2 x7+0.5 x8+x10−service=0
  c9: x4+x5+x8<=1
  sum_eq: 0.2 x2+x3+0.5 x4+0.5 x5+0.2 x7+0.5 x8+x10−service=0
Bounds
  0<=x2<=1
  0<=x3<=1
  0<=x4<=1
  0<=x5<=1
  0<=x7<=1
  0<=x8<=1
  0<=x10<=1
  service>=3.2
Binaries
  x2 x3 x4 x5 x7 x8 x10

Understanding a Conflict Report

The constraints mentioned by presolve (i.e., c5 and c9) are part of the minimal conflict detected by the conflict refiner. The additional information provided by this conflict shows that the lower bound on service quality could also be considered for modification to achieve feasibility: with only one among employees 4, 5, and 8 permitted, any of whom contribute 0.5 to the quality metric, the lower bound on service can not be achieved. Unlike a binary variable, where it would make little sense to adjust either of its bounds to achieve feasibility, the bounds on a continuous variable like service may be worth scrutiny.

The other information this conflict provides is that no change of the upper bound on service, currently infinity, could move the model toward feasibility. Even a finite upper bound would not be part of this conflict (as long as it is larger than the lower bound of 3.2).

Summing Equality Constraints

Note the additional constraint provided in this conflict: sum_eq. It is a sum of all the equality constraints in the conflict. In this case, there is only one such constraint; sometimes when there are more, an imbalance will become quickly apparent when positive and negative terms cancel.

Changing a Bound

Assume that the modeler chooses to repair the infeasibility by reducing the minimum on the service metric, on the grounds that it is a somewhat arbitrary metric. A minimal conflict does not directly tell you the magnitude of change needed. But, in this case, examination of the minimal conflict quickly leads to the deduction that a new lower bound of 2.9 could be achievable. Thus, the modeler might select 2.8, to be safely within feasibility. The model can be modified by entering the command: change bound service lower 2.8.

Re-optimization of the model delivers an optimum, with the output:

Tried aggregator 1 time.

MIP Presolve eliminated 9 rows and 12 columns.

MIP Presolve modified 16 coefficients.

All rows and columns eliminated.

Presolve time=0.00 sec.

Integer optimal solution: Objective=3.3500000000e+02

Solution time=0.00 sec. Iterations=0 Nodes=0

Displaying the solution indicates that employees {2,3,5,6,7,10} are used in the optimal solution.

Adding a Constraint

A natural inquiry might be why so many employees are needed. The modeler could seek an answer by adding a constraint limiting employees to five or fewer, by entering a constraint and re-optimizing, using the commands:

add $x1+x2+x3+x4+x5+x6+x7+x8+x9+x10<=5$ end optimize

The output from the optimizer would indicate the current solution is incompatible with this new constraint. Indeed, no solution to this what-if scenario exists. Output would indicate:

Warning: MIP start values are infeasible.

Retaining MIP start values for possible repair.

Row 'c11' infeasible, all entries at implied bounds.

Presolve time=0.00 sec.

MIP—Integer infeasible.

Current MIP best bound is infinite.

Solution time=0.00 sec. Iterations=0 Nodes=0

Constraint c11, flagged by presolve, is the newly added constraint. Thus, identification of c11 does not reveal much. To learn more about why c11 causes trouble, one could run conflict again, and view the minimal conflict with the command: display conflict all. This would result in the output:

Minimize
  obj:
Subject To
  c2: $x1+x2+0.8\ x3+0.6\ x4+0.4\ x5>=2.1$
  c3: $x6+0.9\ x7+0.5\ x8>=1.2$
  c4: $x9+0.9\ x10>=0.8$
  c11: $x1+x2+x3+x4+x5+x6+x7+x8+x9+x10<=5$
    (omitting the listing of binary variables' bounds)

The constraints in conflict with this new limitation are all of the skill requirements. When viewed in this light, the inconsistency is easy to spot: one employee is obviously needed for constraint c4, two are needed for c3, and a simple calculation reveals that three are needed for c2. Because there is no overlap in the skill sets, five employees are too few.

Unless the modeler is willing to compromise regarding skills, (for example, to relax the righthand side of any of these constraints), constraint c11 must be removed as it is unrealistic to get by with only five employees. Removal is accomplished through the command: change delete constraint c11. This change results in a model with an optimal cost of 335, using six employees.

Changing Bounds on Cost

No better cost is possible in this formulation. It may be desirable to try yet another scenario. Instead of limiting the number of employees, one might focus on the cost, by changing the upper bound of the cost to 330 and re-analyzing. The following commands would be used:

change bound cost upper 330 optimize conflict display conflict all

This series of commands renders the model infeasible and displays a minimal conflict:

Subject To
  c1: $-cost+80\ x1+60\ x2+55\ x3+30\ x4+25\ x5+80\ x6+60\ x7+35\ x8+80\ x9+55\ x10=0$
  c2: $x1+x2+0.8\ x3+0.6\ x4+0.4\ x5>=2.1$
  c3: $x6+0.9\ x7+0.5\ x8>=1.2$
  c5: $0.2\ x2+x3+0.5\ x4+0.5\ x5+0.2\ x7+0.5\ x8+x10-service=0$
  c9: $x4+x5+x8<=1$
Bounds
  $-Inf<=cost<=330$
  $service>=2.9$ The upper bound on cost is, of course, expected to be in the conflict. Relaxing it would merely revert the scenario to the way it was. The constraint c1 defines cost. Unless there is some unexpected latitude in setting salaries, no relief will be found there. Constraints c2 and c3 represent two skill requirements previously judged beyond negotiation. Constraint c5 represents service quality, already compromised. That rough analysis leaves c9, the requirement not to use three particular employees together.

Relaxing a Constraint

How much does it cost to maintain this rule? One could model the employees working productively in a pair or threesome. The upper limit of this constraint could be relaxed and re-optimized using the commands:

change rhs c9 2 optimize

This restores the model to feasibility. The new optimum has an overall cost of 310 and a tangible improvement of 25 over the previous optimum, using employees {2,3,5,6,8,10}. Employee 7 has been removed in favor of employee 8. Is that enough monetary benefit to offset whatever reasons there were for separating employees 4 and 8? That is not a decision to be made here. However, this example model provides some quantitative basis toward making that decision. Additionally, a check of the service variable shows that its solution value is back up to 3.2, a further benefit from relaxing constraint c9.

The solution of 310 could be investigated further by changing the upper bound of cost to be 305, for example. The conflict resulting from this change consists of the skills constraint plus the constraint requiring at least one manager on duty. At this point, the analysis has reached a conclusion, unless the modeler wishes to challenge the modeled policy.

END EXAMPLE

The following is a second example of using the Conflict Refiner in CPLEX to employ one embodiment of the methods set forth herein:

BEGIN EXAMPLE

This example uses the conflict refiner in the C++ API of Concert Technology. It shows modification of one of the standard examples ilomipex2.cpp distributed with the product. That example, contains the statement: cplex.solve( );

Immediately after that statement, one may insert the following lines to prepare for and invoke the conflict refiner:

```
if ( ( cplex.getStatus( ) == IloAlgorithm::Infeasible )
||
        ( cplex.getStatus( ) ==
IloAlgorithm::InfeasibleOrUnbounded ) ) {
        cout << endl << "No solution - starting
Conflict refinement" << endl;
        IloConstraintArray infeas(env);
        IloNumArray preferences(env);
        infeas.add(rng);
        infeas.add(sos1); infeas.add(sos2);
        if ( lazy.getSize( ) || cuts.getSize( ) ) {
            cout << "Lazy Constraints and User Cuts
ignored" << endl;
        }
        for (IloInt i = 0; i<var.getSize( ); i++) {
            if ( var[i].getType( ) != IloNumVar::Bool )
{
                infeas.add(IloBound(var[i],
IloBound::Lower));
                infeas.add(IloBound(var[i],
IloBound::Upper));
            }
        }
        for (IloInt i = 0; i<infeas.getSize( ); i++) {
            preferences.add(1.0); // user may wish to
assign unique preferences
        }
        if ( cplex.refineConflict(infeas, preferences)
) {
            IloCplex::ConflictStatusArray conflict =
cplex.getConflict(infeas);
            env.getImpl( )->useDetailedDisplay(IloTrue);
            cout << "Conflict :" << endl;
            for (IloInt i = 0; i<infeas.getSize( ); i++)
{
                if ( conflict[i] ==
IloCplex::ConflictMember)
                    cout << "Proved : " << infeas[i] <<
endl;
                if ( conflict[i] ==
IloCplex::ConflictPossibleMember)
                    cout << "Possible: " << infeas[i] <<
endl;
            }
        }
        else
            cout << "Conflict could not be refined" <<
endl;
            cout << endl;
}
```

Running this modified version with the first model set forth in the previous example will result in output:
No solution—starting Conflict refinement
Refine conflict on 14 members . . .

| Iteration | Max Members | Min Members |
|---|---|---|
| 1 | 11 | 0 |
| 2 | 9 | 0 |
| 3 | 5 | 0 |
| 4 | 3 | 0 |
| 5 | 2 | 0 |
| 6 | 2 | 1 |
| 7 | 2 | 2 |

Conflict:
Proved: c2(2.1<=(x1+x2+0.8*x3+0.6*x4+0.4*x5)
Proved: c8((x2+x3+x4+x5)<=0)
A few remarks to about that modification are in order. Lazy constraints must not be present in a conflict. User-defined cuts (also known as user cuts) must not be present in a conflict. These lines check for lazy constraints and user-defined cuts:

```
if ( lazy.getSize( ) || cuts.getSize( ) ) {
        cout << "Lazy Constraints and User Cuts
ignored" << end1;
}
```

Because it makes little sense to modify the bounds of binary (0-1) variables, this example does not include them in a conflict. This line eliminates binary variables from consideration:
if (var[i].getType()!=IloNumVar::Bool){
Eliminating binary variables from consideration produces behavior consistent with behavior of the Interactive Optimizer. Doing so is optional. If one prefers for the conflict refiner to work on the bounds of binary variables as well, this test may be omitted. However, it may take much longer to refine the model to a minimal conflict. Finally, the method useDetailedDisplay is included to improve readability of the conflict when it is displayed.

Conflict Application vs Interactive Optimizer

This modified example also demonstrates a few features that are available in the Callable Library and Concert Technology, not in the Interactive Optimizer, i.e., Preferences in the Conflict Refiner and Groups in the Conflict Refiner.

Preferences in the Conflict Refiner

One may assign preference to members of a conflict. In most cases there is no advantage to assigning unique preferences, but something about the model that suggests assigning an ordering to certain members is known, it may be done. A preference of −1 means that the member is to be absolutely excluded from the conflict. A preference of 0 (zero) means that the member is always to be included. Preferences of positive value represent an ordering by which the conflict refiner will give preference to the members. A group with a higher preference is more likely to be included in the conflict. Preferences can thus help guide the refinement process toward a more desirable minimal conflict.

Groups in the Conflict Refiner

One may organize constraints and bounds into one or more groups in a conflict. A group is a set of constraints or bounds that must be considered together. That is, if one member of a group is determined by the conflict refiner to be a necessary in a minimal conflict, then the entire group will be part of the conflict.

For example, in the resource allocation problem from the first model set forth in the previous example, the modeler might consider the three skill requirements (c2, c3, c4) as inseparable. Adjusting the data in any one of them should require a careful re-evaluation of all three. To achieve that effect in the modified version of ilomipex2.cpp, replace the line:
infeas.add(rng);
with the following lines to declare a group of the constraints expressing skill requirements:
infeas.add(rng[0]);

```
IloAnd skills(env);
skills.add(rng[1]);
skills.add(rng[2]);
skills.add(rng[3]);
infeas.add(skills);
for (IloInt i = 4; i<rng.getSize( ); i++) {
   infeas.add(rng[i]);
}
```

(This particular modification is specific to this simplified resource allocation model and thus would not make sense in some other infeasible model run with the modified ilomipex2.cpp application.)

After that modification, the cost constraint and the constraints indexed 4 through 10 are treated individually (that is, normally) as before. The three constraints indexed 1 through 3 are combined into a skills constraint through the IloAnd operator, and added to the infeasible set.

Individual preferences are not assigned to any of these members in this example. But, one could assign preferences if they express one's knowledge of the problem.

After this modification to group the skill constraints, a minimal conflict is reported like this, with the skill constraints grouped inseparably:
Conflict:

```
Proved : IloAnd and36 = {
 c2( 2.1 <= ( x1 + x2 + 0.8 * x3 + 0.6 * x4 + 0.4 * x5 )
 )
 c3( 1.2 <= ( x6 + 0.9 * x7 + 0.5 * x8 ) )
 c4( 0.8 <= ( x9 + 0.9 * x10 ) ) }
Proved : c8( ( x2 + x3 + x4 + x5 ) <= 0)
```

END EXAMPLE

While preferred illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed is:

1. A computer-implemented method for finding an improved solution to a combinatorial optimization problem having constraints, the method comprising:

applying, by a hardware processor, a first heuristic algorithm to the combinatorial optimization problem to identify an infeasible set of the constraints, applying, by a hardware processor, a complete Mixed Integer Program (MIP) tree exploration to the infeasible set of the constraints to identify a minimal conflict, and applying a second heuristic algorithm to the combinatorial optimization problem to identify an infeasible set of the constraints, wherein the second heuristic algorithm is applied after the first heuristic algorithm and before the complete MIP tree exploration.

2. The method of claim 1, wherein the first heuristic algorithm is chosen from the group including presolve and bound strengthening.

3. A computer-implemented method for finding an improved solution to a combinatorial optimization problem having constraints, the method comprising:

applying, by a hardware processor, a first heuristic algorithm to the combinatorial optimization problem to identify an infeasible set of the constraints, applying, by a hardware processor, a complete Mixed Integer Program (MIP) tree exploration to the infeasible set of the constraints to identify a minimal conflict, and applying an irreducibly inconsistent set finder to the combinatorial optimization problem to identify an infeasible set of the constraints, wherein the irreducibly inconsistent set finder is applied after the first heuristic algorithm and before the complete MIP tree exploration.

4. The method of claim 3, wherein the first heuristic algorithm is chosen from the group including presolve and bound strengthening.

5. A software arrangement operable on a processor, the software arrangement for use with a combinatorial optimization problem having constraints, the software arrangement comprising at least one computer program which configures the processor to:

apply a first heuristic algorithm to the combinatorial optimization problem to identify an infeasible set of the constraints, apply a complete MIP tree exploration to the infeasible set of the constraints to identify a minimal conflict, apply a second heuristic algorithm to the combinatorial optimization problem to identify an infeasible set of the constraints, and apply the second heuristic algorithm after the first heuristic algorithm and before the complete MIP tree exploration.

6. The system of claim 5, wherein the first heuristic algorithm is chosen from the group including presolve and bound strengthening.

7. A software arrangement operable on a processor, the software arrangement for use with a combinatorial optimization problem having constraints, the software arrangement comprising at least one computer program which configures the processor to:

apply a first heuristic algorithm to the combinatorial optimization problem to identify an infeasible set of the constraints, apply a complete MIP tree exploration to the infeasible set of the constraints to identify a minimal conflict, apply an irreducibly inconsistent set finder to the combinatorial optimization problem to identify an infeasible set of the constraints, and apply the irreducibly inconsistent set finder after the first heuristic algorithm and before the complete MIP tree exploration.

8. The system of claim 7, wherein the first heuristic algorithm is chosen from the group including presolve and bound strengthening.

9. A computer-readable storage medium containing software for use with a combinatorial optimization problem having constraints, the software comprising code for at least one computer program which may be used to configure a processor to:
- apply a first heuristic algorithm to the combinatorial optimization problem to identify an infeasible set of the constraints, and
- apply a complete MIP tree exploration to the infeasible set of the constraints to identify a minimal conflict,
- apply a second heuristic algorithm to the combinatorial optimization problem to identify an infeasible set of the constraints, and
- apply the second heuristic algorithm after the first heuristic algorithm and before the complete MIP tree exploration.

10. The medium of claim 9, wherein the first heuristic algorithm is chosen from the group including presolve and bound strengthening.

11. The medium of claim 9, wherein at least one portion of the software has not been compiled.

12. A computer-readable storage medium containing software for use with a combinatorial optimization problem having constraints, the software comprising code for at least one computer program which may be used to configure a processor to:
- apply a first heuristic algorithm to the combinatorial optimization problem to identify an infeasible set of the constraints, and
- apply a complete MIP tree exploration to the infeasible set of the constraints to identify a minimal conflict,
- apply an irreducibly inconsistent set finder to the combinatorial optimization problem to identify an infeasible set of the constraints, and
- apply the irreducibly inconsistent set finder after the first heuristic algorithm and before the complete MIP tree exploration.

13. The medium of claim 12, wherein the first heuristic algorithm is chosen from the group including presolve and bound strengthening.

14. The medium of claim 12, wherein at least one portion of the software has not been compiled.

* * * * *